United States Patent
Hackl

(10) Patent No.: US 11,327,842 B2
(45) Date of Patent: May 10, 2022

(54) BACKING UP A SOFTWARE UPDATE OF A CONTROL DEVICE OF TRANSPORT VEHICLE

(71) Applicant: Bayerische Motoren Werke Aktiengesellschaft, Munich (DE)

(72) Inventor: Marion Hackl, Ihrlerstein (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 95 days.

(21) Appl. No.: 16/762,968

(22) PCT Filed: Dec. 19, 2018

(86) PCT No.: PCT/EP2018/085915
§ 371 (c)(1),
(2) Date: May 11, 2020

(87) PCT Pub. No.: WO2019/137773
PCT Pub. Date: Jul. 18, 2019

(65) Prior Publication Data
US 2020/0401484 A1 Dec. 24, 2020

(30) Foreign Application Priority Data
Jan. 11, 2018 (DE) ..................... 10 2018 200 318.1

(51) Int. Cl.
*G06F 11/14* (2006.01)
*G06F 8/654* (2018.01)
(Continued)

(52) U.S. Cl.
CPC ...... *G06F 11/1433* (2013.01); *B60R 16/0231* (2013.01); *G06F 8/654* (2018.02); *G06F 16/245* (2019.01); *G06F 2201/805* (2013.01)

(58) Field of Classification Search
None
See application file for complete search history.

(56) References Cited

U.S. PATENT DOCUMENTS

| 5,843,138 A | 12/1998 | Evers et al. |
| 2007/0169080 A1* | 7/2007 | Friedman ................. G06F 8/65 717/168 |

(Continued)

FOREIGN PATENT DOCUMENTS

| DE | 698 33 992 T2 | 4/2007 |
| DE | 10 2008 021 030 A1 | 10/2009 |

(Continued)

OTHER PUBLICATIONS

International Search Report (PCT/ISA/210) issued in PCT Application No. PCT/EP2018/085915 dated Mar. 25, 2019 with English translation (four (4) pages).

(Continued)

*Primary Examiner* — Qing Chen
(74) *Attorney, Agent, or Firm* — Crowell & Moring LLP

(57) ABSTRACT

A transport vehicle, a server, and a method for backing up a software update of a control device of the transport vehicle are provided. The method includes the steps: transmitting a first data set representing a current software version of the control device by the transport vehicle to a server, storing the first data set in the server; determining that a software update of the control device must occur; generating a second data set representing a target software version of the control device as a function of the first data set by the server; and transmitting the first data set and the second data set and a software package for updating the control device according to the second data set from the server to the transport vehicle.

7 Claims, 2 Drawing Sheets

(51) Int. Cl.
*G06F 16/245* (2019.01)
*B60R 16/023* (2006.01)

(56) References Cited

U.S. PATENT DOCUMENTS

| | | | |
|---|---|---|---|
| 2008/0046879 A1* | 2/2008 | Hostetler | H04L 67/02 |
| | | | 717/171 |
| 2009/0300595 A1* | 12/2009 | Moran | G06F 8/65 |
| | | | 717/170 |
| 2014/0325500 A1* | 10/2014 | Jang | G06F 8/65 |
| | | | 717/173 |
| 2015/0301821 A1* | 10/2015 | Danne | H04L 67/06 |
| | | | 717/169 |
| 2015/0347121 A1* | 12/2015 | Harumoto | H04L 67/2871 |
| | | | 717/172 |
| 2016/0070559 A1* | 3/2016 | West | G06F 8/65 |
| | | | 717/172 |
| 2016/0291965 A1* | 10/2016 | Li | G06F 8/65 |
| 2017/0242679 A1 | 8/2017 | Sangameswaran et al. | |
| 2018/0075058 A1* | 3/2018 | Boutnaru | G06F 16/1787 |
| 2018/0150290 A1* | 5/2018 | Matsuda | B60R 16/0231 |
| 2018/0275983 A1* | 9/2018 | Kwon | G06F 8/65 |

FOREIGN PATENT DOCUMENTS

| | | |
|---|---|---|
| DE | 10 2008 056 745 A1 | 5/2010 |
| DE | 10 2012 205 709 A1 | 10/2013 |
| DE | 10 2017 100 750 A1 | 8/2017 |
| DE | 10 2017 209 468 A1 | 12/2018 |
| EP | 2 863 303 A1 | 4/2015 |

OTHER PUBLICATIONS

German-language Written Opinion (PCT/ISA/237) issued in PCT Application No. PCT/EP2018/085915 dated Mar. 25, 2019 (seven (7) pages).

German-language Search Report issued in German Application No. 102018200318.1 dated Dec. 19, 2018 with partial English translation (25 pages).

\* cited by examiner

BACKING UP A SOFTWARE UPDATE OF A CONTROL DEVICE OF TRANSPORT VEHICLE

BACKGROUND AND SUMMARY OF THE INVENTION

The present invention relates to a method, a transport vehicle as well as a server for backing up a software update of a control device of a transport vehicle. In particular, the present invention relates to the necessity of maximum safety with regard to a hardware configuration when updating software components of control devices.

Modern transport vehicle comprise considerable amounts of data, which sometimes have to be changed/supplemented when components must be updated for safety purposes or functional supplementations, as well as for bugfixes. These days vehicle programming of safety-relevant (ASIL relevant) levels is possible/allowed only in controlled environments (e.g. in an authorized specialized workshop). At present only non-safety-critical levels can be programmed/updated via a respective back-end in a vehicle on the road.

A disadvantage of the above-mentioned prior art consists in that software updates at safety-relevant-ASIL-relevant levels can only be carried out under controlled conditions. In particular, this requires the use of computers/laptops dedicated for this purpose, and a cable connection (e.g. via an OBD socket) must be established for data transmission. Thus it is not possible to functionally improve ASIL-relevant functions via an available back-end. If safety gaps in existing vehicles have become known, recalls must be organized, which is time-consuming and expensive. Besides, it is not possible to load new functionalities, which are ASIL-relevant, into a vehicle which is on the road/"in the field". Nor is it possible, therefore, for a customer to increase the optional equipment level for safety-relevant/ASIL-relevant functions (e.g. driver assistance systems).

Insofar as safety-relevant levels are to be loaded into vehicles on the road via a back-end, the E/E infrastructure of the entire vehicle would have to be ASIL capable, which is very time-consuming and expensive. This is in particular due to the fact that in order to back up the software versions on different control devices, a complete check of the actually installed data is required. Moreover, as regards ASIL-relevant hardware, communication must be backed up, and double storage capacity is required for a redundant protection of data. Such an architecture, in particular for complex head unit control devices, is at present not economical. It is an object the present invention to meet the above-mentioned demand.

The above-mentioned object is achieved according to the invention by a method for backing up a software update of a control device of a transport vehicle. The software update can be performed as an update of an operating system of the control device. Alternatively or additionally, individual functions or a plurality of functions can be changed/updated via the software update. During updating of its software the control device is linked into the onboard system of the transport vehicle. To back up the software update, in a first step a first data set reflecting a current software version of the control device is transmitted to a server (also the back-end) via the transport vehicle. Transmission can be carried out by wire and/or wirelessly. The first data set may for example comprise a table of installed control devices (SVT), which identifies the software versions of several control devices, at least however of the above-mentioned control device, of the vehicle onboard system. The server may, in particular, be a stationary server, which is operated by a manufacturer of the transport vehicle and/or by service companies appointed by it. In particular an authorization of the transport vehicle for communication with the server may be predefined in the transport vehicle. In other words, an identifier of the transport vehicle by the server can be automatically queried before the server, in a next step, receives and stores the first data set. In this way the server is notified of which data is present in the onboard system of the transport vehicle. In particular the server is notified of the versions of the data packets of the onboard system of the transport vehicle. At least, however, the server obtains information allowing it to detect whether updating of at least one control device of the onboard system of the transport vehicle is possible and/or sensible. The server can ascertain this by way of the first data set, in which for example the above-mentioned SVT is represented, in particular contained. Based on the first data set the server can then generate a second data set, which represents a target software version of the control device. In particular the software may be contained in the second data set. Alternatively or additionally, the second data set may identify the manner in which a software data set is to be used by the control device or control devices for updating. The second data set therefore may comprise a target SVT, at least however a hash value for the updated SVT. Subsequently the second data set is transmitted to the transport vehicle, in order to perform the updating of the control device in accordance with the second data set. The second data set may be transmitted by the server to the transport vehicle. In particular the first data set and/or a software packet may also be transmitted to the transport vehicle for updating the control device. By means of the first data set the transport vehicle can check whether the first data set initially sent to the server coincides with the received first data set. In this way it is possible in a simple manner to check the communication between the transport vehicle and the server. If, on comparing the sent first data set to the received data set in the control device, it is found that there are no differences, it may be assumed that transmission of the second data set and/or of the software packet is also sufficiently safe. If differences are found between the first data set sent by the control device and the first data set received by the control device, the above-mentioned method may be repeated in order to ensure that the first data set received by the server does not contain any transmission errors and the first data set received by the control device does not contain any transmission errors either.

Expressed differently, a core idea of the invention consists in that to start with the first control device (e.g. the media graphic unit (MGU)) uses the individual installed-control-device identifiers (SVK) to form an actual SVT (SVT_Ist), which is sent to the back-end/the server. The back-end then checks as to whether a software update is present for the existing hardware configuration. The updated software version is returned to the control device as SVT_Soll. In addition the target data sets and actual data sets/hash values can be provided with unique identifiers and sent to the control device. This may comprise forming cyclical redundancy checks (CRC) via the data sets. The identifiers and the CRCs are used to enable buffering of the safety-relevant data in a control device which is ASIL-non-compliant. Such control devices are also called QM (quality management) backed-up control devices. As a consequence a control device, which is for example designed as body domain controller, can detect all safety-relevant errors of the ASIL-non-compliant control device. The latter can, for example, store hash values as actual data sets and target data sets, flash the control devices of the vehicle information onboard system and optionally subsequently delete the target SVT. Then, a current SVT (SVT after RSU) is generated and its hash value is also formed. This is done, for example, without identifying the SVT generated after the remote software update. However, a CRC can be generated again here in order to also back up the transmission from the first control device (ASIL-non-compliant) to the third control device (ASIL-compliant). The ascertained hash values can now be sent from the first control device (e.g. MGU) to the third control device (e.g. BDC) and the BDC can perform a comparison of the hash values and check whether the identifiers and CRCs are in order. In this way it can be ensured that all control devices of the vehicle onboard system are updated correctly, without having to check the flashed data itself. Since in the prior art the flashed data itself always had to be checked via cable, ASIL-relevant hardware could not be updated as a remote software update (RSU). In this way the present invention contributes to making a function increase and/or software update of the hardware of a control device onboard system more flexible. It thus becomes possible to back up the data version without a concrete check of the flashed data. In addition an ASIL-non-compliant control device is used in a safety-relevant transmission chain, whilst nevertheless all safety-relevant errors are able to be detected in the third control device.

The data packets generated in the back-end server can be collated in a common data packet, from which a common checksum is formed with this being sent to the transport vehicle. In this way both the first data sets sent by, and the first data sets received by, the first control device and also correct receipt of the second data set can be verified by the control device.

In order to keep the expenditure for the data communication/data traffic to a minimum, the first data set may represent a hash value for an installed-control-device table. Transmission of a hash value is associated with a reduced data volume to be transferred and can therefore accelerate the process according to the invention.

The first data set sent from the server to the transport vehicle as well as the second data set and in particular also the software packet can be identified in a predefined manner, in order to allow the transport vehicle to identify them, respectively. In other words, the first data set, the second data set and the software packet are identified by the server in a manner which is known to the onboard system of the transport vehicle, in particular to the control device.

All data sets to be exchanged between the control device and the server/between the server and the control device can be subjected to a cyclical redundancy check (CRC) in order to ensure optimum detection of transmission errors in this manner.

In order to be able to ensure comprehensive updating of the software within the vehicle onboard system by means of the first control device, the first data set can be stored by the control device in addition to the second data set. Subsequently, individual (in particular all of the) control devices of the transport vehicle can be flashed by the first control device. In this way the high computing capacity of the first control device can be utilized, whereas in the prior art an external data processing device was always required for flashing the control devices of the transport vehicle. According to the invention this process can even be performed by an ASIL-non-compliant first control device, as a result of which it is possible to use a simplified hardware architecture and less costly hardware.

Subsequently the software of the flashed further control devices can be queried by the control device. In other words, an identifier of the updated software versions of the flashed further control devices can be queried and depending on responses from the further control devices a third data set can be generated. The third data set represents an actual (new) software version of the control device. This can for example be compared with the second data set, which represents the target software version of the control device. If the comparison of the second data set with the third data set results in a difference, a normal updating operation of the software of the control device has failed. If the comparison results in a match between the second data set and the third data set, the software has been successfully updated.

With further preference, a hash value can be generated for the third data set. Subsequently a respective hash value for the first data set, the second data set and the third data set can be sent to a second control device (e.g. body domain controller (BDC)) of the transport vehicle. The hash values represent a test value, by means of which the data sets can be compared with each other and checked for integrity. In particular, it can be checked in a first step whether the first data set is classified/denoted as "previous data set" and/or the second data set is classified/denoted as "target data set" and/or the third data set is classified/denoted as "uncertain". The third data set in particular can be understood to mean "uncertain" because no corresponding hash value can be assigned to it by the ASIL-non-compliant first control device. Insofar as the above classification of the first, second and third data set is successful, it can be determined in a next step that the software packet was successfully received and/or installed. If this is however not the case, in a next step the transport vehicle can be prevented from being able to be taken into operation/used for a continued journey.

According to a second aspect of the present invention, a transport vehicle is proposed which can be backed up as per the above-mentioned method with regard to a software update. The transport vehicle comprises a control device and a transmit/receive device. The control device may be the control device to be updated. The transmit/receive device can be used for communication with the server. It is arranged to send a first data set to a server, which represents a current software version of the control device of the transport vehicle. After the server has received the first data set in accordance with the above-mentioned method, it can store the first data set, ascertain the necessity of a software update of the control device of the transport vehicle and generate a second data set, which represents a target software version of the control device. This is done based on the first data set. In particular the server can generate a hash value for the updated SVT represented by the first data set. Subsequently the server transmits a second data set and a software packet for updating the control device in accordance with the second data set to the transport vehicle. The transmit/receive device receives the second data set, the software packet and in particular also the first data set, thereby enabling the transport vehicle to implement the features, feature combinations and advantages of the above mentioned method (proportionally). In other words, the transport vehicle is arranged to be used as a transport vehicle in a method according to the invention.

According to a third aspect of the present invention, a server is proposed for backing up a software update of a control device of a transport vehicle. The server comprises an evaluation unit, a storage means and a transmit/receive device. The evaluation unit can be realized as a programmable processor, a microcontroller or similar. The transmit/ receive device may comprise a communications device operating in a wired and/or wireless manner. This is arranged to receive a first data set from the transport vehicle, which represents a current software version of the control device/the onboard system of the transport vehicle. The evaluation unit of the server is arranged to store the first data set in the storage means, to ascertain that a software update of the control device of the transport vehicle has to be carried out and to generate a second data set based on the first data set, which represents a target software version of the control device of the transport vehicle. The second data set may also be understood as a target SVT/the hash value thereof. The transmit/receive device is further arranged to transmit the second data set and a software packet to the transport vehicle for updating the control device in accordance with the second data set. In this context, the first data set/a copy thereof may also be sent to the transport vehicle so that proper communication can be checked by a comparison of the sent first data set with the received first data set by the transport vehicle.

Further details, features and advantages of the invention are revealed in the description hereunder and in the figures.

DETAILED DESCRIPTION OF THE DRAWINGS

Figure 1:
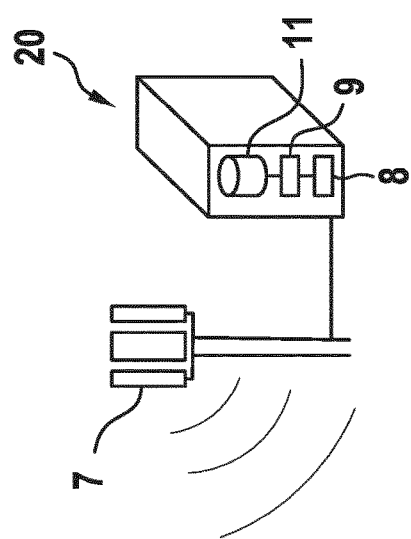
FIG. 1 is a schematic depiction of an exemplary embodiment of a transport vehicle according to the invention in communication with an exemplary embodiment of a server according to the invention when executing an exemplary embodiment of a method according to the invention for backing up a software update.
Figure 1:
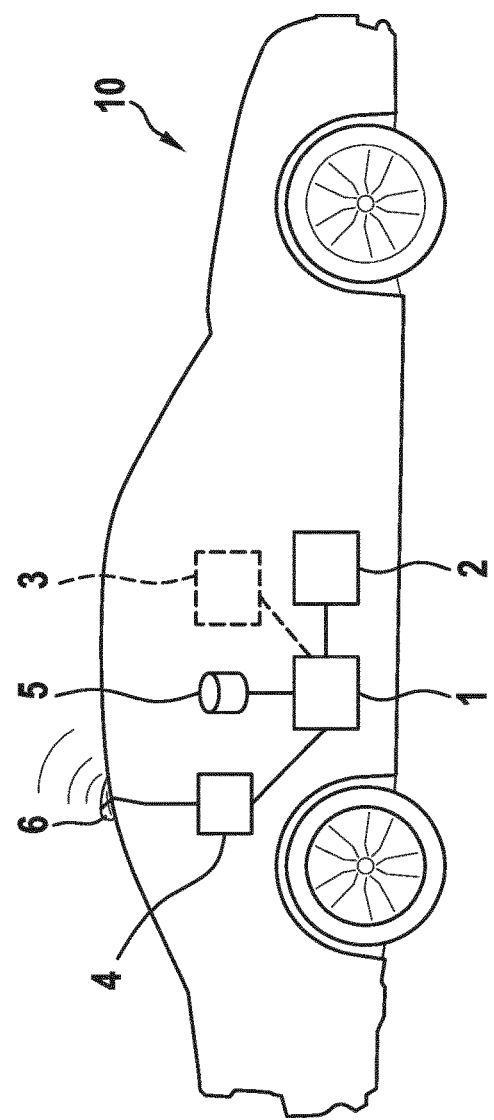

FIG. 1 shows a passenger car 10 representing an exemplary embodiment of a transport vehicle according to the invention, which is capable of communicating via a transmit/receive device 4 connected to an antenna 6 with a radio tower 7. The transmit/receive device 4 is connected in terms of information technology to a first control device in the form of a media graphic unit (MGU) 1, which in turn is connected to a data memory 5. In addition, the MGU 1 has cable-bound information channels to ASIL-compliant second control devices in the form of a body domain controller 2/a further control device 3. The ASIL-non-compliant MGU 1 can update the control devices 2, 3 in accordance with the method according to the invention by generating a current SVT with the aid of the control devices 2, 3 and send it as a first data set to the server 20. Alternatively or additionally, the first data set may also be implemented as a hash value of the current SVT. Using the first data set received by way of the radio tower 7 and the transmit/receive device 8, the evaluation unit 9 of the server 20 can ascertain whether a more up-to-date software version for the passenger car 10 is available in the storage device 11. If this is the case, the evaluation unit 9 of the server 20 is arranged to execute the steps already described above, which will be discussed in more detail with reference to FIG. 2.

Figure 2:
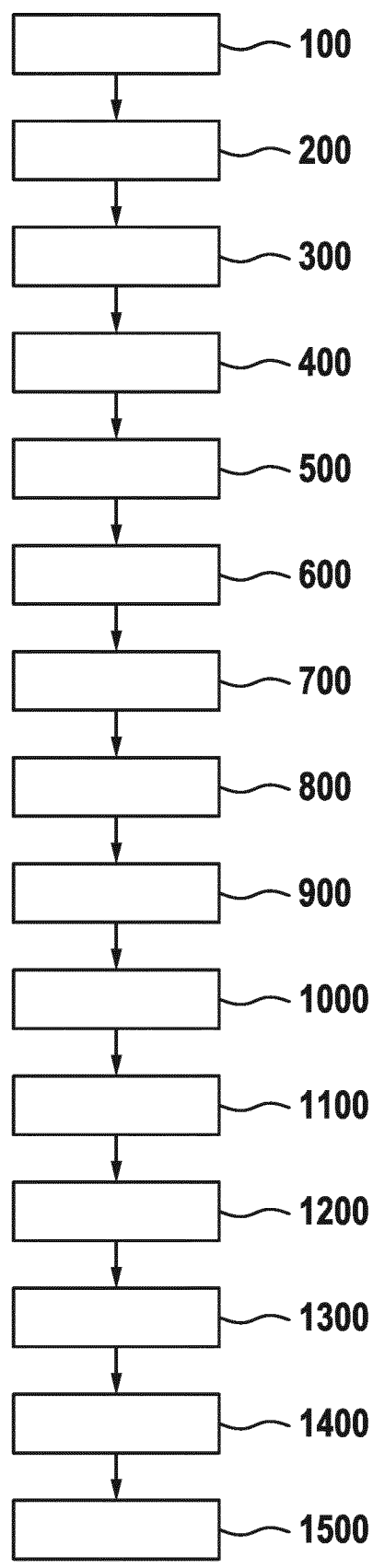
FIG. 2 is a flow diagram illustrating steps of an exemplary embodiment of a method according to the invention for backing up a software update.

FIG. 2 shows steps of an exemplary embodiment of a method according to the invention for backing up a software update of a control device of a transport vehicle. In step 100 a first data set is sent via a transport vehicle to a server, which represents a current software version of the control device/of all control devices of the transport vehicle. In other words, the first data set may be understood to be an installed-control-device table of the control devices, which potentially require updating according to the invention, of the information onboard system of the transport vehicle. Subsequently the first data set is received by the server in step 200 and stored in a storage means thereof. In step 300 the server ascertains by means of the first data set that the software of the control device of the transport vehicle requires updating. Thereafter in step 400, a second data set is generated which, based on the first data set, represents a target software version of the control device. The second data set may also be understood as a target SVT/as the hash value thereof. In step 500 a cyclical redundancy check regarding the first and the second data set is then executed. In step 600 the first data set, the second data set and a software packet for updating the control device, in respect of which a CRC may also be executed, are transmitted from the server to the transport vehicle. In step 700 the first data set and the second data set are stored by the control device of the transport vehicle. In step 800 the control devices of the transport vehicle, which are addressed by the second data set, are flashed by the control device. To check whether the updating was successful, the flashed further control devices are then queried in step 900 as to which software versions they now have. Depending on the responses of the further control devices a third data set is generated in step 1000, which represents an actual software version of the control device and of all the control devices. In other words a data set is generated which, in the case of a successful software update, is identical to the second data set. Using a simple comparison between the third data set and the second data set it can be ascertained in this manner whether the target software version of the transport vehicle has been successfully established. In step 1100 a hash value for the third data set is ascertained and in step 1200 respective hash values for the first, second and third data set are sent to a second control device of the transport vehicle. The second control device in particular may be an ASIL-compliant control device (e.g. a body domain controller (BDC)). In step 1300 the ASIL-compliant second control device checks each received data set in order to determine whether at least one is classified as "old" and/or one is classified as "target" and/or one is classified as "uncertain". As described above, the above-mentioned classification may apply to respective hash values or respective SVTs analogously and may be checked in this step. Insofar as the checking of the data sets/the classification of the data sets was performed successfully, it is determined in step 1400 that the software packet was successfully received and installed. Otherwise the opposite is determined in step 1500 and the transport vehicle is prevented from continuing its journey. It is at least possible to restrict or deactivate an extent of functions of the transport vehicle which, due to the incorrect software updating, could have disadvantageous consequences.

In this way, despite the fact that an ASIL-non-compliant control device was involved in updating an ASIL-compliant control device, it is possible to perform software update backups which meet the safety requirements of ASIL-compliant control devices.

LIST OF REFERENCE SYMBOLS 1 (QM/ASIL non-compliant) control device
2 Second control device/BDC
3 Further control device
4 Transmit/receive device
5 Data memory 6 Antenna
7 Radio tower
8 Transmit/receive device
9 Evaluation unit
10 Passenger car
11 Data memory (storage device)
20 Server
100-1500 Method steps

What is claimed is:

1. A method for backing up a software update of a first control device of a transport vehicle, comprising the steps of:
    transmitting a first data set representing a current software version of the first control device by the transport vehicle to a server;
    storing the first data set in the server;
    ascertaining that a software update of the first control device must be conducted;
    generating a second data set representing a target software version of the first control device based on the first data set by the server;
    transmitting the first data set, the second data set, and a software packet for updating the first control device in accordance with the second data set from the server to the transport vehicle;
    storing the first data set and the second data set by the first control device;
    flashing a number of further control devices of the transport vehicle by the first control device;
    querying current software versions of the further control devices flashed by the first control device and, depending on responses from the further control devices, generating a third data set representing an actual software version of the first control device;
    generating a hash value for the third data set; and
    transmitting a respective hash value for:
        the first data set,
        the second data set, and
        the third data set,
    to a second control device in the form of a body domain controller of the transport vehicle.

2. The method according to claim 1, wherein the first data set comprises a hash value for an installed-control-device table (SVT) in the server.

3. The method according to claim 2, wherein the step of ascertaining that a software update of the first control device must be conducted is carried out by way of the SVT in the server.

4. The method according to claim 1, further comprising the step of:
    executing a cyclical redundancy check as regards at least one of:
        i. the first data set,
        ii. the second data set, and
        iii. the software packet.

5. The method according to claim 1, further comprising the step of:
    checking, by the second control device, received data sets in order to determine whether one is classified as "old" and/or one is classified as "target" and/or one is classified as "uncertain".

6. The method according to claim 5, further comprising the steps of:
    determining, provided the check of the received data sets is successful, that the software packet was successfully received; and
    otherwise preventing the transport vehicle from continuing a journey.

7. A method for backing up a software update of a first control device of a transport vehicle, comprising the steps of:
    receiving, by a server, a first data set representing a current software version of the first control device transmitted by the transport vehicle;
    storing the first data set in the server;
    ascertaining that a software update of the first control device must be conducted;
    generating a second data set representing a target software version of the first control device based on the first data set by the server;
    transmitting the first data set, the second data set, and a software packet for updating the first control device in accordance with the second data set from the server to the transport vehicle;
    storing the first data set and the second data set by the first control device;
    flashing a number of further control devices of the transport vehicle by the first control device;
    querying current software versions of the further control devices flashed by the first control device and, depending on responses from the further control devices, generating a third data set representing an actual software version of the first control device;
    generating a hash value for the third data set; and
    transmitting a respective hash value for:
        the first data set,
        the second data set, and
        the third data set,
    to a second control device in the form of a body domain controller of the transport vehicle.

* * * * *